United States Patent [19]

ElDifrawi et al.

[11] 4,196,720
[45] Apr. 8, 1980

[54] SOLAR ENERGY COLLECTING STRUCTURE

[75] Inventors: Ahmed A. ElDifrawi; Terence W. McLorg; Lloyd H. Rain, all of Lexington, Ky.

[73] Assignee: Irvin Industries Inc., Stamford, Conn.

[21] Appl. No.: 835,884

[22] Filed: Sep. 23, 1977

[51] Int. Cl.² ............................................. F24J 3/02
[52] U.S. Cl. ................................. 126/438; 126/436; 126/446
[58] Field of Search ............... 126/270, 271, 436, 446, 126/450, 438, 439; 237/1 A; 52/2; 350/295, 320, 296

[56] References Cited

U.S. PATENT DOCUMENTS

| | | | |
|---|---|---|---|
| 965,391 | 7/1910 | Little | 237/1 A |
| 2,484,127 | 10/1949 | Stelzer | 126/270 |
| 3,182,654 | 5/1965 | Culling | 126/270 |
| 3,415,719 | 12/1968 | Telks | 126/271 |
| 3,894,685 | 7/1975 | Keyes et al. | 126/270 |
| 4,038,967 | 8/1977 | Stout et al. | 126/271 |
| 4,046,462 | 9/1977 | Fletcher et al. | 52/2 X |
| 4,059,226 | 11/1977 | Atkinson | 237/1 A |
| 4,062,352 | 12/1977 | Lesk | 126/271 |
| 4,073,283 | 2/1978 | Lof | 237/1 A |
| 4,160,443 | 7/1979 | Brindle et al. | 126/400 X |

Primary Examiner—James C. Yeung
Assistant Examiner—Larry Jones
Attorney, Agent, or Firm—McAulay, Fields, Fisher & Goldstein

[57] ABSTRACT

The structure disclosed includes an air supported transparent membrane which encloses a solar collector unit. The solar unit includes a solar collector element and two angled walls that support and position the element. The solar collector element receives and absorbs solar radiation and provides heat to a circulating fluid. The support walls extend forwardly and outwardly from the collector element and have reflecting facing surfaces to increase the amount of radiation falling on the element. The walls extend rearwardly of the element to define a chamber in which small rocks are stored to provide heat storage. The transparent membrane creates a greenhouse effect within the chamber defined by the membrane, increasing the operating temperature and thus the conversion efficiency of the solar collector element. Furthermore, the air supported membrane protects the solar collector unit from wind loading. Thus the unit can be lighter than otherwise might be the case and can be pivoted to have an optimum attitude as a function of the time of year. In addition, protection of the solar collector element from wind and rain means that a thin transparent plastic glazing can be and is used in the element.

11 Claims, 6 Drawing Figures

SOLAR RADIATION

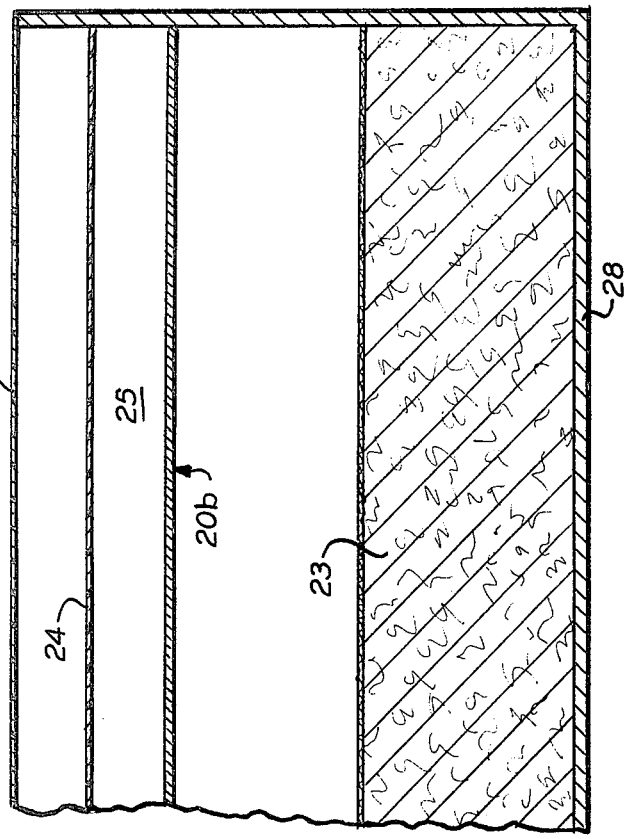
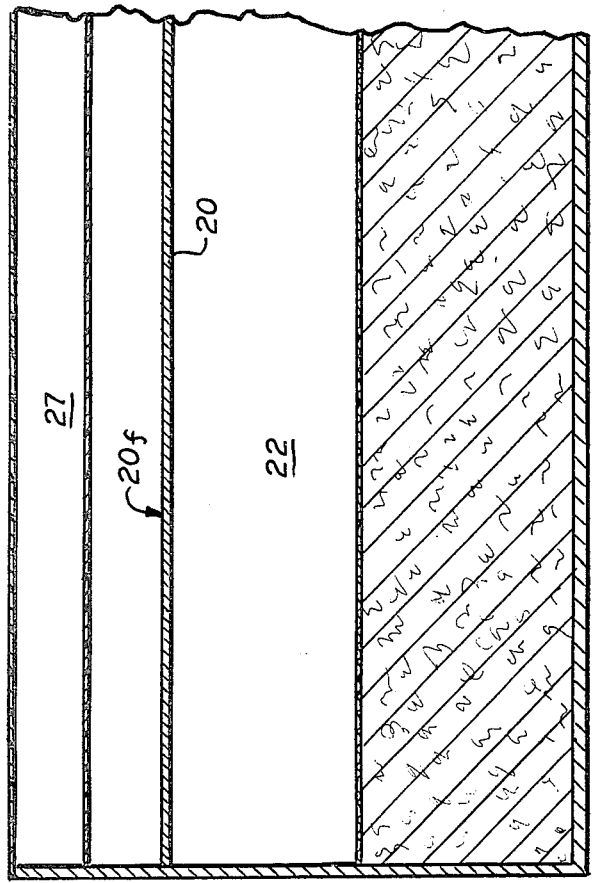
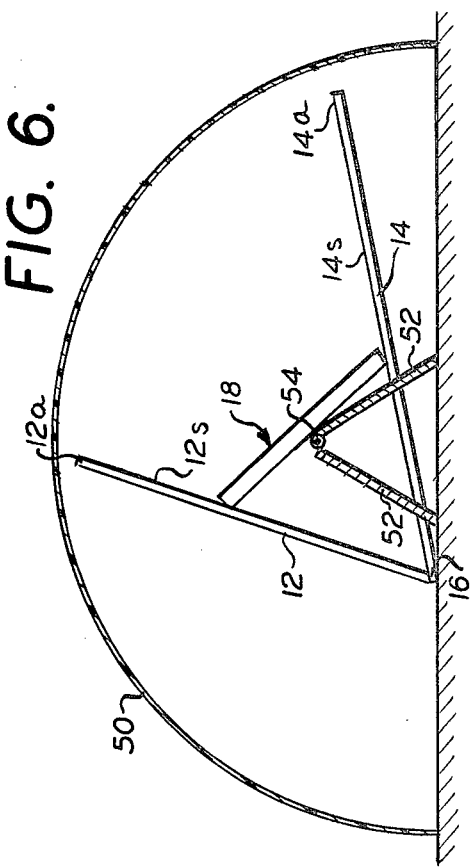
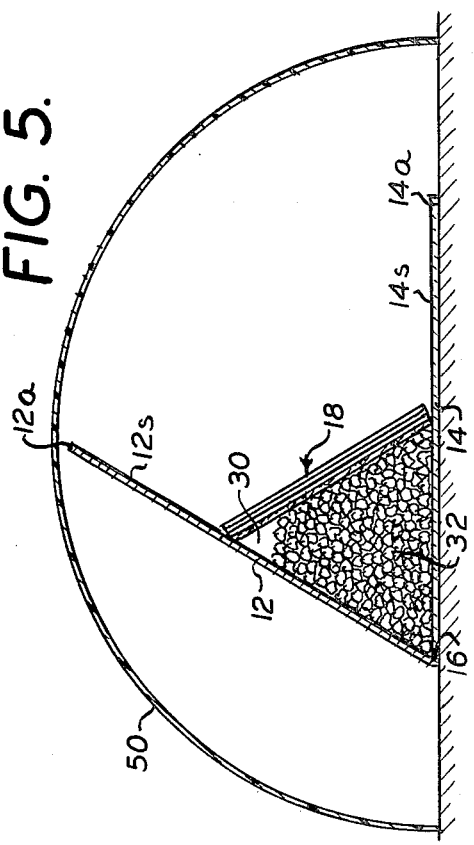

SOLAR ENERGY COLLECTING STRUCTURE

BACKGROUND OF THE INVENTION

This invention relates in general to solar collector devices and to solar heating and cooling systems employing such devices.

Solar heating has long been considered a source of energy. But solar heat collectors have had poor efficiency. They have not converted enough of the incident radiation to heat to warrant the cost of installation. Accordingly there has been limited use of solar energy, particularly for heating and cooling.

Solar radiation is converted into usable heat by flat plate solar collector elements. These collector elements include a metal plate, usually steel, aluminum or copper, which are painted black so as to absorb solar radiation. The metal plate is called an absorber plate. A first glass plate is spaced about two centimeters in front of this solar radiation absorbing surface thereby creating a dead air space which provides insulation from loss of heat off the front surface of the metal plate. A second glass plate is normally spaced another two centimeters from the first glass plate to create a second dead air space. In this fashion, convection currents at the front surface of the metal plate are minimized. These glass plate substantially increase the efficiency of operation of the solar collector element. They also reduce the amount of radiation incident on the metal plate.

As used herein, reference to the "efficiency" of the solar collector element or unit or module refers to the percentage of solar radiation incident on the solar collector element that is converted to usable heat.

In one type of solar heating system, the back surface of the metal absorber plate forms one surface of a chamber through which air is pumped. This air is heated by contact with the absorber plate. Since the air acts to cool the absorber plate this type of system is frequently called an air cooled collector type of solar heating system. The heated air is then used to heat any desired space such as the rooms of a building. In another type of solar heating system, called a water cooled collector type of system, water pipes are soldered to or otherwise permanently affixed to the back surface of the metal absorber plate. These so-called liquid cooled solar collectors heat the water which is then used to provide a hot water heating system.

A major object of this invention is to increase the performance of a solar collector, meaning specifically to increase the amount of heat transmitted to the fluid that is used to carry off heat from the absorber plate.

As used herein, the term "insolation" refers to the rate of solar radiation that falls on the surface of the collector element. Insolation is measured in calories/minute-$cm^2$. An increase of insolation will improve the performance of the solar collector system. As indicated above, the term "efficiency" refers to a measure of the percentage of insolation which is converted to usable heat. Thus, an increase in insolation as well as an increase in efficiency will provide an improvement in the performance of a solar heating system.

Accordingly, it is a purpose of this invention to improve both the insolation and the efficiency of a solar collector.

A further purpose of this invention is to increase the performance of the solar collector to a point where the fluid being heated can readily be brought to a temperature (of at least 90° C.) where the fluid can be used to power an absorption air conditioner, a Rankine cycle engine or the like.

The overall performance of the system can also be improved if the solar collector structure permits changing the elevation of the solar collector unit a few times a year in order to optimize its orientation to incident solar radiation and thus increase its average insolation. Accordingly, it is a further object of this invention to provide a solar collector unit sufficiently light in weight so that its elevation can be changed when required.

It is important that any increase in the performance of the solar collector occur in a solar collector design that does not greatly increase the cost of the collector or the cost of installation. Accordingly, it is a further purpose of this invention to provide an increase in the performance of a solar collector at a cost factor which reduces the unit cost of heat provided.

BRIEF DESCRIPTION

In brief, one embodiment described herein includes an elongated solar collector unit having first and second sidewalls that extend, for example, 20 meters in length and which in cross section form two sides of an equilateral triangle. These walls may be four meters wide from the apex where they are joined to their respective outer ends. The walls extend East and West so that the open aperture defined by the walls optimally faces the sun. A solar collector element extends between the two walls and runs the length of the walls. This element is oriented at an angle of 60° to each of the two walls and is positioned about two meters out from the apex so that a chamber is defined by the back of the element and the two walls. This chamber, in cross section, is an equilateral triangle two meters on a side. The facing surfaces of the walls extending forward of the collector element are reflective so as to increase the amount of solar radiation falling on the collector element.

This solar unit comprising, the walls and element, is enclosed in an air supported transparent plastic membrane which by virtue of a greenhouse effect provides an increased temperature environment for the collector unit. The membrane also takes the wind loading and thus protects the solar unit from forces due to wind. As a consequence, the solar unit is lighter and simpler in structure than otherwise would be the case.

The solar element includes the usual black metallic absorber plate but instead of glass panels in front of the absorber plate, the glazing is constituted by thin transparent plastic membranes.

In use, the air to be heated is pumped through a passageway immediately behind the absorber plate and is directed into the building to be heated. When the building is at a desired temperature, the heated air is redirected through the chamber behind the solar element where small rocks absorb and store heat. When extra heat is needed, as during the nighttime, cooler air from outside or from the building is pumped through the rocks to pick up the stored heat for delivery to the building.

As in any air supported structure, the air supported membrane is stabilized by an air pressure maintained within the chamber defined by the membrane that is slightly greater than ambient air pressure. The air employed to maintain this pressure is preferably exhaust air from the building being heated so that maximum benefits of the greenhouse effect are obtained.

BRIEF DESCRIPTION OF THE DRAWINGS

FIG. 4 is an enlarged cross-sectional view of the solar collector element portion and is taken along the same plane as in the FIG. 2 view. FIG. 4 is fragmented along a center zone.

FIG. 5 is a cross-sectional view similar to that of FIG. 2 of a second embodiment of this invention.

FIG. 6 is a cross-sectional view similar to that of FIG. 2 of a third embodiment of the invention.

DESCRIPTION OF THE PREFERRED EMBODIMENTS

Figure 1:
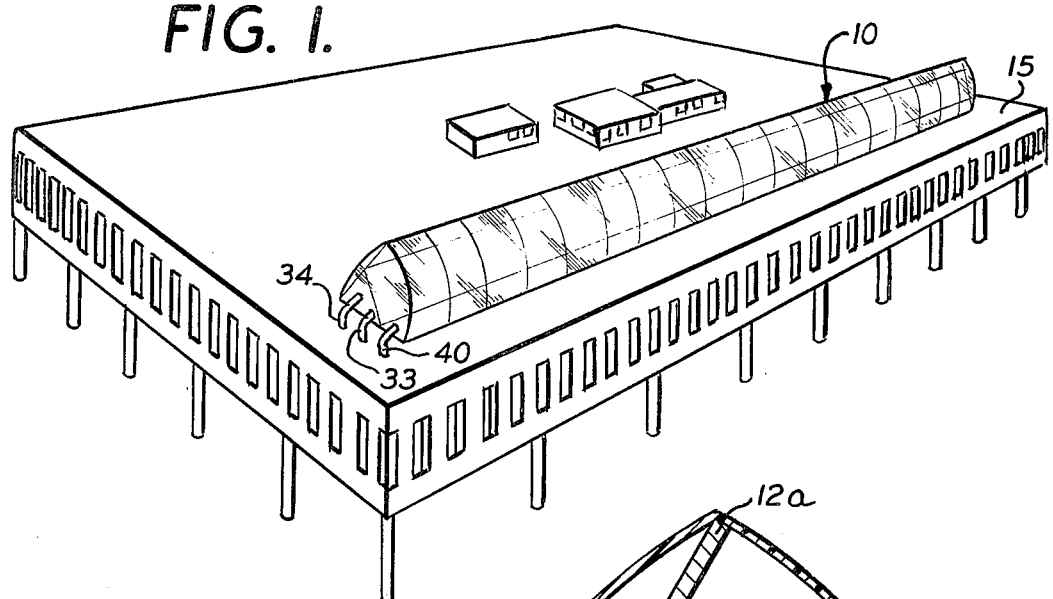
FIG. 1 is an isometric view of a solar collector structure in accordance with a first embodiment of this invention.
Figure 2:
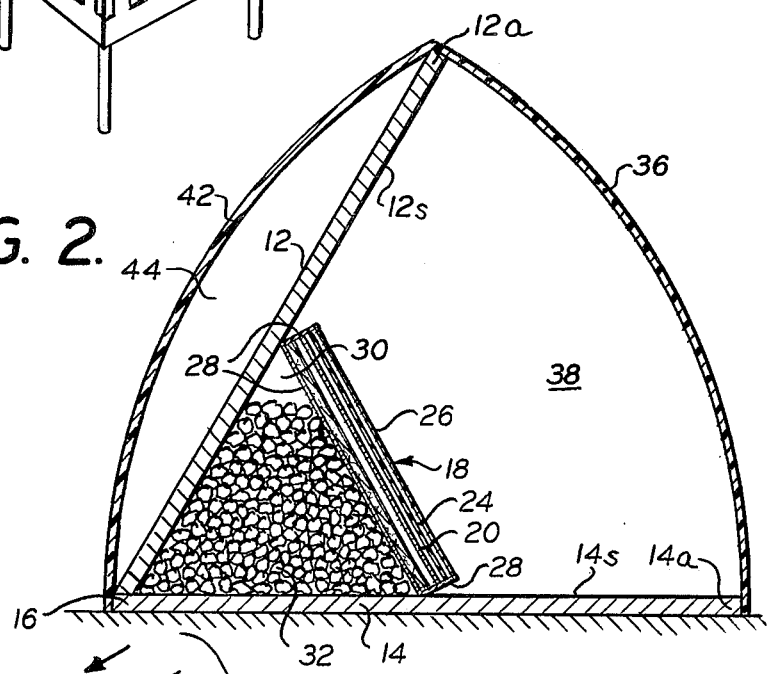
FIG. 2 is a cross-sectional view along the plane 2—2 through FIG. 1.

With reference to FIGS. 1 through 4, all of which refer to the same embodiment, there is shown a solar collector structure 10 having first and second longitudinal walls 12 and 14. The wall 14 rests on a surface such as a roof of the building 15 and may be termed a basewall. The wall 12 extends up from the basewall 14 at an angle of 60° and may be called a backwall because the aperture defined by the forward edges 12a and 14a of the two walls is generally considered the front of the collector unit 10. In a typical embodiment each of these walls 12 and 14 may be four meters wide from apex 16 to ends 12a or 14a respectively. The length of the walls 12 or 14 may be any desired length and they could well be twenty-five meters long.

The solar collector element 18 is deployed at an angle of 60° to each of the two walls 12 and 14 and extends the length of the collector unit 10. As shown in the very much larger scale drawing of FIG. 4, the element 18 is composed of a number of layers. A key operative layer is a metal plate 20 which extends the length of the collector unit 10. The plate 20 is made of aluminum or steel and is coated black. The forward surface 20F of this plate 20 faces the aperture of the collector unit 10. The plate 20 receives and absorbs solar radiation and converts it into heat. Thus the metal plate 20 is called a solar absorber plate. This plate 20 is typically four millimeters thick and preferably has a rough surface on the back. Immediately behind the plate 20 is a five centimeter deep passageway 22 which extends the length of the collector and through which the air to be heated is passed. This air, through contact with the back surface 20b of the metal plate, picks up heat from the plate 20 and carries the heat away to the rooms or area to be heated. As is known, this back surface 20b should be somewhat roughened so that there is a degree of turbulent flow and maximum transfer of heat from absorber plate 20 to air in the passageway 22. Rearwardly of the passageway 22 is an approximately five centimeters thick layer of encased glass fibers 23 that provide inulation and prevent undue loss of heat from the heated air in the passageway 22. In front of the absorber plate 20 there is a first thin transparent plastic sheet 24 that extends the length of the collector 10. This sheet may be as thin as 0.15 millimeters and may be made of polytetrafluoroethylene (Teflon) or polyvinylfluoride (Tedlar). The sheet 24 is spaced approximately two centimeters from the plate 20 thereby providing a dead air space 25 that minimizes loss of heat from the front surface of the plate 20. A second thin transparent plastic membrane 26 spaced another two centimeters in front of the first membrane 24 creates a second dead air space 27 to provide further insulation and further minimization of air currents that would convect heat away from the front surface of the absorber plate 20. These components of the solar collector element 18, specifically the glass fiber insulation 23, absorber plate 20 and membrane 24 and 26 are all mounted in a channel 28. The channel, in turn, is mounted on the walls 12 and 14. The base of this channel 28 together with the inboard half of the walls 12 and 14 defines a chamber 30 which, in cross section, is an equilateral triangle having a side of two meters. The chamber 30 is substantially filled with small rocks 32 (between one to five centimeters average diameter) which serve as a heat storage medium.

In use, the air to be heated is fed through duct 33 into the passageway 22. The air passing along the passageway 22 absorbs heat from the absorber plate 20 and is then pumped to the area to be heated. Where the area to be heated has been adequately heated, or where not all of the air coming through the passageway 22 is required, this heated air is diverted by a valving mechanism (not shown) through duct 34 into one end of the chamber 30. This heated air then passes through the chamber 30 and in so doing transfers a substantial portion of its heat to the rocks 32. The rocks 32 are an adequate inexpensive storage medium for heat that can be used at a later point. Then, at night, when the solar collector element 18 is no longer providing significant heat, air to be heated can be passed through the rock filled chamber 30 to pick up heat from the rocks and to deliver it to the space to be heated.

Figure 3:
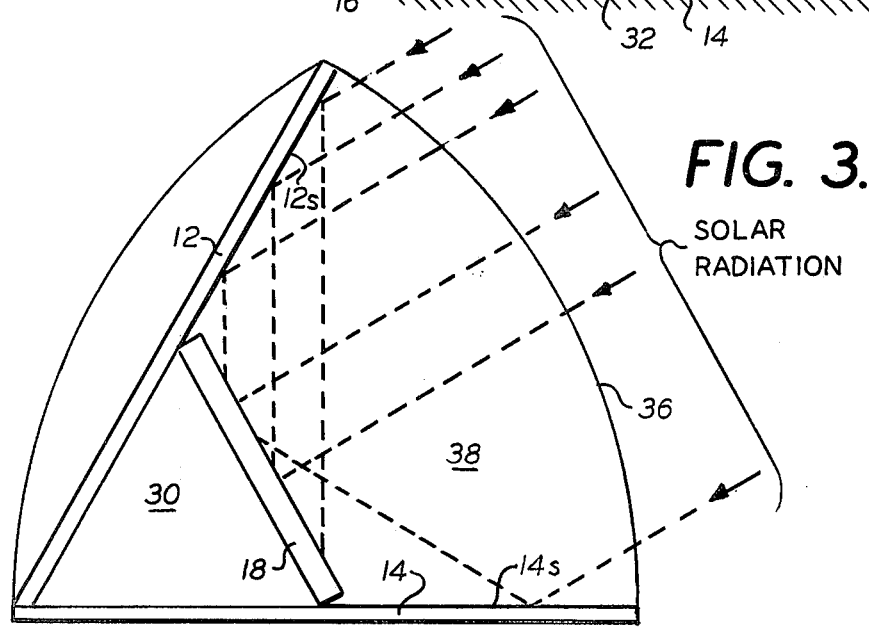
FIG. 3 is a schematic illustration of the manner in which the sun's rays are received by the solar collector of FIG. 1.

The inwardly facing surfaces 12s and 14s of the walls 12 and 14 are silvered, or otherwise made reflecting, along their width forward of the solar collector element 18. Thus, as shown in FIG. 3, these walls surfaces 12s and 14s serve to reflect additional solar radiation onto the collector element 18 during a substantial portion of the day when solor radiation is available. Accordingly, the amount of insolation on the collector element 18 is increased and the performance of the solar collector unif 10 improved.

A transparent plastic membrane 36, which may be made of polytetrafluoroethylene (Teflon) or polyvinylfluoroide (Tedlar) is connected across the forward ends 12a and 14a of the two walls thereby enclosing a chamber 38 in the zone immediately in front of the solar collector element 18. This membrane 36 is at least one mm thick. This chamber 38 is relatively substantial in size, extending not only the length of the collector device 10 but having two meter wide walls 12s, 14s and approximately a four meter wall along the width of the collector element 18. This chamber 38 creates a greenhouse effect thereby substantially raising the ambient temperature under which the collector element 18 operates and increasing the efficiency of the collector element.

When the outside temperature is low enough so that the exhaust air is warmer than can be created by the greenhouse effect, then exhaust air from the area being heated is pumped through duct 40 and through chamber 38 to provide warm air within the chamber 38 and thus optimize the efficiency of the element 18. When the outside temperature is in the range of 2° C. or warmer, the greenhouse effect (which adds as much as 15° C.) will usually provide a higher temperature in the chamber 38 than can the exhaust air. In that case, the outlet duct (not shown) from the chamber 38 is closed by a valve. Then exhaust air is pumped in only in amounts necessary to maintain the air inflated structure.

As shown, the main transparent membrane 36 has a width greater than the straight line distance between the ends 12a and 14a. The exhaust air pumped into the chamber 38 is pumped in at a very slight pressure above atmospheric (about 2.5 cm of water) so that the membrane 36 is bowed outwardly and is stabilized by the air pressure in the same fashion as in an air support structure. In this fashion, a very effective support is provided for the membrane 36. In addition, the curvature of the membrane 36 aids in resisting wind loading and increases the stability of the structure.

In part for this reason, a further membrane 42 is connected between the apex 16 and the end 12a on the back side of the backwall 12. This membrane 42 is also sized so that it will bow where shown when the chamber 44 between the membrane 42 and wall 12 is provided with air under slight pressure. This membrane 42, together with the membrane 36, provides substantial wind resistance and structural stability so that the walls 12 and 14 can be extended forward, as shown, to provide the reflective surfaces 12s and 14s. This back membrane 42, however, is opaque and may be made of a triple membrane of the type used in conventional air support structures. The insulation provided by the back membrane 42 together with the insulation provided by the air chamber 44 aids in preventing heat loss through the backwall 12 thereby further enhancing the performance of the collector unit 10.

FIG. 1 shows inlet ducts 33, 34 and 40 leading respectively into one end of the chambers 22, 30 and 38. Comparable outlet ducts are provided at the other end but are not shown in the FIGS.

As used herein, the term "solar collector element" refers to the element 18, which is shown in detail in FIG. 4, or any similar such element. As used herein the phrase "solar collector unit" refers to the solar collector element plus any support structure such as the walls 12 and 14 which is associated with it. As used herein, the phrase "solar collector structure" refers to the entire solar collector related structure including the membranes that provide the greenhouse effect and resist wind loading.

FIG. 5 represents a second embodiment of this invention which may be preferred under certain conditions particularly where wind loading is expected to be high. Most of the elements in the FIG. 5 embodiment are the same as in the FIG. 2 embodiment and thus the same reference numerals are used. In particular, the solar collector element 18 and the sidewalls 12,14 are the same. However, instead of having two membranes attached across the ends of the sidewalls, a single transparent air supported membrane 50 encloses the solar collector unit 12, 14, 18. The membrane 50 is spaced from the ends 12a, 14a of the sidewalls 12, 14 by an amount sufficient so that any movement or adjustment of the membrane under wind loading will not result in contact between the membrane 50 and the sidewalls 12 or 14 thereby minimizing the loading on these sidewalls and permitting the construction of a lighter and less expensive unit.

FIG. 6 illustrates a further embodiment in which the solar unit 12, 14, 18 is supported on a stand 52 so that it can pivot about an axis 54. In this fashion the elevation of the solar unit can be readily adjusted during the course of the year to provide an optimum attitude toward the sun. The FIG. 6 arrangement is feasible because of the lightweight nature of the unit made possible by this invention. In the FIG. 6 arrangement the rock storage medium is not included because it would be unduly heavy and make the pivoting arrangement complex and costly. The pivoting in FIG. 6 may be achieved by journalling the stand 52 to a longitudinal support bar (not shown) attached to the back surface of the channel 28.

The solar collector unit is normally and optimally alligned in an East West direction, facing South in the northern hemisphere. During the summer when the sun rises higher than during the winter, it would be optimum to have the solar facing aperture (that is, the distance between the points 12a and 14a) elevated more upwardly as is shown in FIG. 6. In the winter, the vertical attitude or elevation shown in FIG. 1 or 5 might be preferable. This adjustment can be made with the FIG. 6 construction because the membrane 50 does not have to be moved to make the adjustment.

The employment of the membranes 36 and 42 or the overall membrane 50 makes it possible to provide a structure which is resistant to wind loading and to do so with a unit that is relatively light compared to what otherwise would have to be the case. The elimination of glass plates and minimization of the size of the framework all tend toward a lighter and less costly structure. The lighter solar collector unit makes possible a design in which the elevation of the unit to the sun during the course of the year can be adjusted at a reasonable cost in equipment and labor.

The combined effect of the increased temperature of the air in the chamber 38 and the increased insolation due to the reflective surfaces 12s and 14s improves the performance of the system significantly. The improvement is sufficient so that there is a wide range of ambient conditions in which this solar collector can be used to heat fluid to a temperature high enough, i.e. over 90° C., so that the fluid can provide the temperature differential required in an absorption air conditioner or to run an engine employing the Rankine cycle.

The membranes, such as the membrane 50, is referred to herein as transparent. This is because the present preferred membrane will have a light transmission characteristic close to the range of glass. However, it should be understood that the light transmission characteristic might well be substantially less than that of glass and that the term transparent as used in the specification and claims herein simply means that the membrane so characterized has a substantial light transmission characteristic. There is a trade-off between structural integrity of the membrane and its transparency characteristic. Under some circumstances, the improved performance of the structure of this invention may permit striking a balance in that trade-off which would employ a less transparent but more structurally sound membrane. Known membranes which may be usable in the device of this invention have a light transmission characteristic that ranges from as low as 40% to as high as 98%. Structural considerations will normally dictate that the other membrane 36 or 50 will have lower light transmissivity than will the glazing membranes 24, 26.

Although three embodiments of the invention have been illustrated and described in detail, the invention can be adapted to a number of different arrangements. For example, an air cooled solar collector element 18 has been described but the invention can readily be adapted to a water cooled type of absorber plate and collector arrangement.

What is claimed is:

1. A solar energy collecting structure comprising:
   a longitudinally extending solar collector having a substantially rigid absorber plate having front and back surfaces,
   said structure having fluid inlet means and fluid outlet means for passing a fluid across the back surface of said absorber plate to transfer heat from said plate to the fluid,
   first and second opposed longitudinal walls extending outwardly and forwardly from first and second opposed longitudinal edges of said solar collector, the planes of said walls forming an obtuse angle with the plane of said solar collector, the facing surfaces of said walls being reflective to solar radiation,
   an air supported structure having a longitudinally extending transparent membrane, said membrane being disposed outwardly of said reflective walls,
   said transparent membrane, said solar collector and said reflective walls substantially defining a first chamber, said first chamber being enclosed and isolated from the ambient atmosphere,
   said solar collector and said walls extending substantially the longitudinal distance of said transparent membrane.

2. The structure of claim 1 further comprising: a further membrane extending across the back surface of one of said walls and forming a further chamber between said one of said walls and said further membrane.

3. The structure of claim 2 wherein said solar collector plate comprises: an absorber plate and a first thin transparent plastic cover sheet in front of and spaced from said absorber plate.

4. The structure of claim 2 further comprising: heat retaining means within a second chamber positioned behind said solar collector plate, said second chamber being substantially defined by said solar collector plate, said first wall and said second wall, said longitudinal walls extending rearwardly and inwardly from said first and second opposed longitudinal edges of said solar collector plate.

5. The structure of claim 3, wherein said solar collector plate further comprises: a second thin transparent plastic cover sheet in front of and spaced from said first plastic cover sheet.

6. The solar energy collecting structure of claim 3 wherein: said membrane is spaced from said reflective walls sufficiently so that at wind loading up to a predetermined magnitude, said membrane remains spaced from said reflective walls.

7. The structure of claim 1 wherein said solar collector plate comprises; an absorber plate and a first thin transparent cover sheet in front of and spaced from said absorber plate.

8. The structure of claim 7 wherein said solar collector plate further comprises: a second thin transparent plastic cover sheet in front of and spaced from said first plastic cover sheet.

9. The solar energy collecting structure of claim 1 wherein: said membrane is spaced from said reflective walls sufficiently so that at wind loading up to a predetermined magnitude, said membrane remains spaced from said reflective walls.

10. The structure of claim 9 further comprising: heat retaining means within a second chamber positioned behind said solar collector plate, said second chamber being substantially defined by said solar collector plate, said first wall and said second wall, said longitudinal walls extending rearwardly and inwardly from said first and second opposed longitudinal edges of said solar collector plate.

11. The structure of claim 1 further comprising: heat retaining means within a second chamber positioned behind said solar collector plate, said second chamber being substantially defined by said solar collector plate, said first wall and said second wall, said longitudinal walls extending rearwardly and inwardly from said first and second opposed longitudinal edges of said solar collector plate.

* * * * *